No. 753,064. PATENTED FEB. 23, 1904.
J. GRAFF.
BEVEL AND SQUARE.
APPLICATION FILED MAY 6, 1903.
NO MODEL.

WITNESSES:
Fred White
René Bruine

INVENTOR:
Jacob Graff,
By Attorneys,

No. 753,064. Patented February 23, 1904.

UNITED STATES PATENT OFFICE.

JACOB GRAFF, OF NEW YORK, N. Y.

BEVEL AND SQUARE.

SPECIFICATION forming part of Letters Patent No. 753,064, dated February 23, 1904.

Application filed May 6, 1903. Serial No. 155,800. (No model.)

*To all whom it may concern:*

Be it known that I, JACOB GRAFF, a citizen of the United States, residing in the borough of Bronx, city, county, and State of New York, have invented a certain new and Improved Bevel and Square, of which the following is a specification.

My invention aims to provide an improved tool for laying off angles in various kinds of work, such as the making of templets or patterns or in any carpenter's or similar work.

The invention provides improvements in a tool combining both a bevel and a square and certain improvements applicable to each of these whether used in combination or separately.

The accompanying drawings illustrate an embodiment of the invention.

Figure 1:
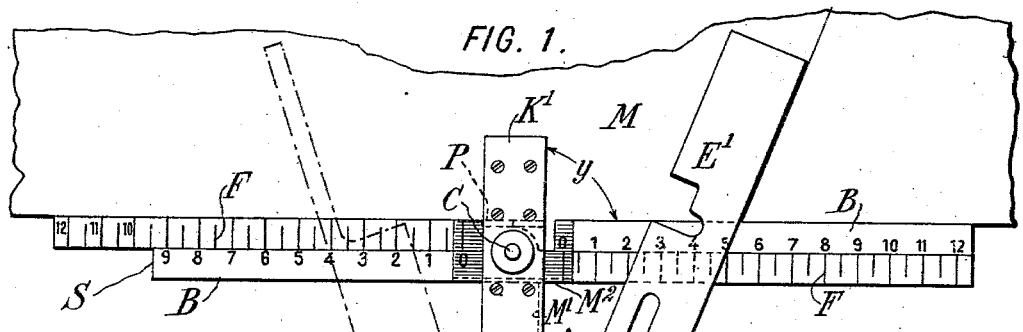
Figure 2:
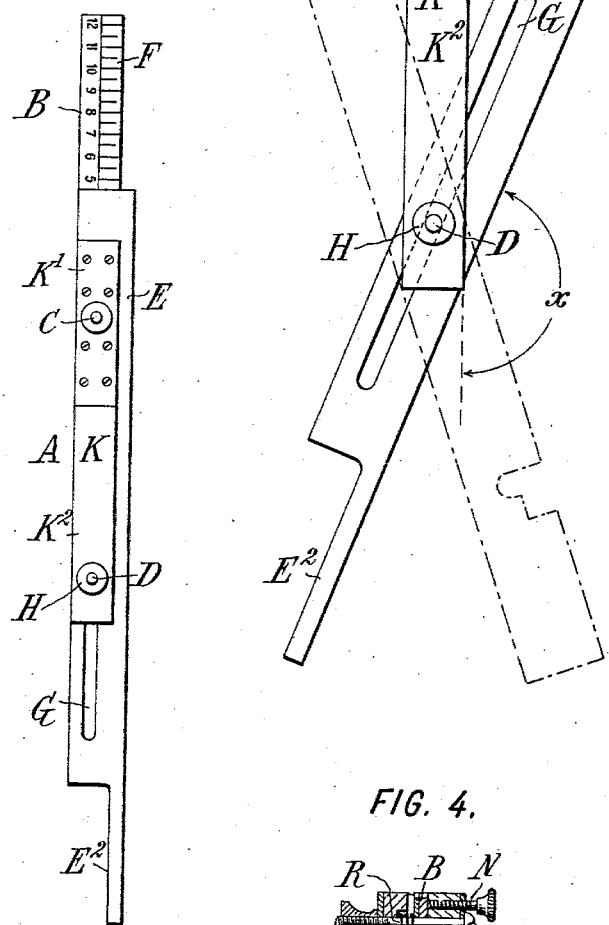
Figure 3:
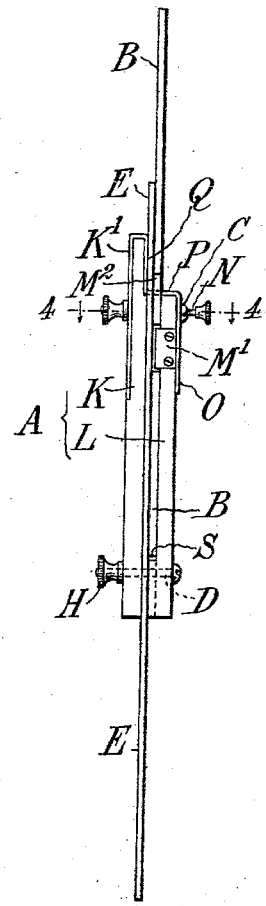
Figure 4:
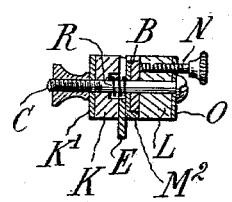

Figure 1 is a plan of the combined tool in use. Fig. 2 is a plan of the same folded. Fig. 3 is a side view of the same folded. Fig. 4 is a cross-section on the line 4 4 of Fig. 3.

In the embodiment of the complete invention illustrated the tool is provided with a body to which is attached a square-blade—that is, a blade for laying off square or right angles—and a bevel-blade—that is, a blade for laying off bevels or oblique angles. The square-blade is arranged at right angles to the body at or near one end of the latter, and the bevel-blade is pivoted to the body at a standard distance from the point of attachment of the square-blade. The free end of the bevel-blade can then swing over the square-blade, and the face of the latter, carrying a scale marked in fractions of the standard distance, can lay off any desired angle. Preferably the square-blade extends on both sides of the body, and the bevel-blade is adapted to swing to one or the other side of the body, so as to lay off angles either to the right or the left, as desired. Preferably, also, the square-blade is pivoted to the body, so that the two blades may swing in parallel with the body when it is desired to fold the entire tool.

Referring to the drawings, the body A of the tool carries near one end a square-blade B, projecting to both sides thereof. The square-blade is attached to the body, preferably by means of a pivot C. Near the opposite end of the body is a pivot D, about which the bevel-blade E can swing. In a line parallel to the edge of the square-blade and passing through the center of the pivot C said blade B carries, preferably marked directly thereon, as shown, a scale F, marked in fractions of the standard distance C D. For example, for most purposes in this country the distance C D will be considered to be the equivalent of a foot, and the scale F will be divided into twelfths of this distance, which will be considered the equivalents of an inch, each of these "inches" being subdivided into halves, fourths, &c. For other systems of measurement the scale will be laid off accordingly. With the scale thus laid off a bevel of, say, five inches in twelve or five inches to the foot will be obtained by turning the bevel-blade E until its outer edge coincides with the mark "5" on the square-blade. Thereupon the bevel-blade will be clamped in position, as hereinafter described, so as to give at once the desired angle.

It will be seen at once that this is more convenient than the present system in vogue among mechanics in all trades and which consists in first laying off the desired angle on a sheet of paper or board and then setting an ordinary bevel to fit such angle and clamping it. The zero-point of the scale will be determined by turning the bevel-plate E in until its outer edge is parallel with the line between the centers C D.

For determining angles in opposite directions the blade E is arranged, first, on one side of the body A, as illustrated in full lines in Fig. 1, and then on the opposite side, as indicated in dotted lines. The blade swings around its pivot D for this purpose. A slot G is provided in the bevel-blade, through which the pivot D passes, and when the blade is unclamped it may slide relatively to the pivot, so as to extend its operative end a considerable distance beyond the edge of the square-blade B. In Fig. 1 it is shown only partly extended; but it may extend any suitable distance, limited only by the length of the slot G. A particular point of value in this construction is that when the blade E is turned from the position at that side of the body shown in full lines to that shown in dotted lines the blade may be pushed along until the pivot-pin D is in the opposite end of the slot G, so that in either case it is only the portion of the blade beyond the end of the slot which projects backward from the pivot D. The tool may thus fold much more compactly than if the blade were pivoted at a fixed point and may still extend a considerable distance over the work beyond the edge of the square-blade B. Any suitable clamp may be used for holding the bevel-blade in position after it has been set. I have shown, for example, a thumb-nut H, which turns on the threaded pivot-pin D and squeezes together the two parts of the body A shown, and so clamps the blade in the desired position.

The body of the tool comprises an upper portion K and a lower portion L, the former of which projects, as at K', beyond the latter, so that it may extend over the work and hold the tool even with the face of the work in use. The square-blade B has its forward edge coinciding with (or it may lie beyond) the forward end of the lower portion L, so that it provides a long bearing on the edge of the work, and thus prevents accidental lateral movement of the tool in use. The bevel-blade E extends over the face of the square-blade, as explained, and beyond the forward edge of the square-blade over the work. Thus in Fig. 1, M is a sheet or board on which the bevel is to be laid off. Supposing a bevel of five inches in twelve is required, the tool is set, as explained, and is then brought up against the edge of the work, as illustrated, and the line at the desired angle drawn along the outer edge of the bevel-blade E.

In order to permit the square-blade to fold, it is pivoted, as previously explained, so that it may swing in parallel with the body, as shown in Fig. 2. When it is swung out for operation, a stop M', Fig. 3, engages the rear edge of its right-hand portion, so as to determine its true right-angle position. A set-screw N passes through the lower portion L of the body in a position to engage and hold the square-blade firmly in its right-angle position, (or, in fact, in any other desired position.) Various stops and locking devices other than those shown might be substituted, and those illustrated are merely given as examples.

The upper and lower portions or members of the body may be held together at the rear end of the tool by means of the screw and nut D and H. At the opposite end they may be united by a metal plate O, having the necessary rigidity and which provides flat faces P and Q at the points where the tool bears against the work, which will not wear with use and which thus keep the tool always very accurate. The portion P of the metal plate which extends across the opening between the members of the body is of only half its normal width at this point, as indicated in dotted lines in Fig. 1, and the upper edge of the square-blade is cut away, as indicated in this figure, so as to permit it to fold snugly to the position of Fig. 2. Similarly the extreme left-hand portion of the square-blade B is cut away, as shown at S, to prevent interference by the pivot D. The ends of the bevel-blade E are also cut away to make room in the folded position of the tool for the pivot C and the plate P. The bevel-blade may be simply cut into at its edge, as shown at the end E' thereof, or its inner edge may be entirely cut away, as shown at the end $E^2$. The construction of these various details does not affect the broad invention.

The uses of the tool described are numerous and will readily suggest themselves to a skilful mechanic. Fig. 1 shows the tool used for laying out a bevel or angle of which the tangent or ratio of the scale distance to the standard distance is a fractional quantity. Of course the square-blade B and the scale thereon might be made of greater length than the standard distance from C to D; but with the tool described this is not necessary. Where an angle of, say, twelve inches in five is to be laid off, the tool may be inverted and the edge $K^2$ of the upper portion of the body laid against the edge of the work, in which case the outer edge of the bevel-blade will lay off the angle $x$, which will be the angle desired. The tool may be used also as a square alone, leaving the bevel-blade either closed or opened and laying either edge of the lower member L of the body against the edge of the work, in which case the angle $y$ will be the angle laid off.

When the square-blade is made of wood, it may be protected by a metal strip $M^2$ where it strikes the stop M' and at any other point subjected to extra wear. The tool might be made to fold more compactly by forming the square-blade of two pivoted sections or by using a bevel-blade pivoted at a fixed point near one end and adapted to swing entirely around in changing from one end to the other of the square-blade. Obviously, also, instead of indicating the rectangular components of the bevel to be laid off the scale on the square-blade might be marked to indicate the angle in degrees, though the former method of describing a bevel is more common in this country. In fact, both kinds of scales might be marked on the square-blade. Also the lines of the scale might be either parallel, as shown, or radial. Where the scale indicates angular degrees, the divisions of the scale will of course not be in all cases exactly even fractions of the standard distance. The blade B may be held in position by means of a spring R, Fig. 4, or in any other suitable way.

Though I have described with great particularity of detail a tool embodying the various improvements in my invention, yet I am not to be understood as limiting the invention to the specific embodiment disclosed.

Various modifications thereof in detail and in the arrangement and combination of the parts may be made by those skilled in the art without departure from the invention.

What I claim is—

1. A tool comprising in combination, a body, a square-blade attached thereto and extending at right angles to both sides thereof, a bevel-blade pivoted to said body at a standard distance from the point of attachment of the square-blade and adapted to extend over the face of the square-blade, the latter carrying a scale in fractions of said standard distance, and said bevel-blade being adapted to slide endwise relatively to its pivotal point.

2. A tool comprising in combination, a body, a square-blade pivoted thereto at an intermediate point of its length to permit it to fold parallel therewith or to extend at right angles on both sides thereof, and a bevel-blade pivoted to said body at a standard distance from the point of attachment of the square-blade and adapted to extend over the face of the square-blade, the latter carrying a scale in fractions of said standard distance, and said bevel-blade being adapted to slide endwise relatively to its pivotal point.

3. A tool comprising in combination, a body having an upper and a lower portion, the former projecting beyond the latter to extend over the work, a square-blade having its forward edge in position to provide a long bearing on the edge of the work, and a bevel-blade pivoted to the body at a standard distance from the point of attachment of the square-blade and adapted to extend over the face of the square-blade and over the work, the square-blade carrying a scale in fractions of said standard distance.

4. A tool comprising in combination a body having an upper and lower portion, the former projecting beyond the latter to extend over the work, a square-blade pivoted between said portions to permit it to fold parallel therewith or to extend at right angles thereto with its forward edge in position to provide a long bearing on the edge of the work, a stop for determining the right-angle position of said square-blade, and a bevel-blade pivoted between said upper and lower portions at a standard distance from the pivotal point of the square-blade and adapted to extend over the face of the square-blade and over the work, the square-blade carrying a scale in fractions of said standard distance.

5. A tool comprising in combination a body having an upper and a lower member, the former projecting beyond the latter to extend over the work, a square-blade pivoted between said members to permit it to fold parallel therewith or to extend at right angles thereto with its forward edge coinciding with the forward end of the lower member to provide a long bearing on the edge of the work, a bevel-blade pivoted to the body at a standard distance from the pivotal point of the square-blade and adapted to extend over the face of the square-blade, the latter carrying a scale in fractions of said standard distance, and a metal plate having a portion P extending over the end of said lower member.

6. A tool comprising in combination, a body, a square-blade attached thereto and extending at right angles to both sides thereof, a bevel-blade pivoted to said body at a standard distance from the point of attachment of the square-blade and adapted to be extended over the face of said square-blade at both sides of the body, the square-blade carrying a scale in fractions of said standard distance.

In witness whereof I have hereunto signed my name in the presence of two subscribing witnesses.

JACOB GRAFF.

Witnesses:
 DOMINGO A. USINA,
 FRED WHITE.